United States Patent [19]
Sakamoto et al.

[11] Patent Number: 5,476,303
[45] Date of Patent: Dec. 19, 1995

[54] UNDERCARRIAGE STRUCTURE OF MOTOR VEHICLE

[75] Inventors: Toshinori Sakamoto, Higashi-Hiroshima; Mitsuru Fujinaka, Hiroshima; Keisuke Tanaka, Hiroshima; Toshiyo Mito, Hiroshima; Hayatsugu Harasaki, Hiroshima; Tohru Furusawa, Hiroshima, all of Japan

[73] Assignee: Mazda Motor Corporation, Hiroshima, Japan

[21] Appl. No.: 217,146

[22] Filed: Mar. 24, 1994

[30] Foreign Application Priority Data

Mar. 30, 1993 [JP] Japan .................................. 5-072396

[51] Int. Cl.⁶ ............................................. B62D 21/02
[52] U.S. Cl. ............................. 296/204; 296/63; 280/781
[58] Field of Search .................................. 280/781, 797; 296/204, 209, 194, 63, 65.1

[56] References Cited

U.S. PATENT DOCUMENTS

| | | |
|---|---|---|
| 2,190,551 | 2/1940 | Swallow . |
| 3,177,031 | 4/1965 | Schilberg .................... 296/204 |
| 3,202,451 | 8/1965 | Auger et al. . |
| 4,068,884 | 1/1978 | Watanabe et al. ............... 296/204 |
| 4,804,222 | 2/1989 | Sakiyama et al. .............. 296/204 |
| 5,011,201 | 4/1991 | Takahashi ...................... 296/209 |
| 5,174,628 | 12/1992 | Hayatsugu et al. ............. 296/204 |

FOREIGN PATENT DOCUMENTS

| | | |
|---|---|---|
| 0059147 | 9/1982 | European Pat. Off. . |
| 743439 | 11/1943 | Germany . |
| 3525036 | 1/1987 | Germany . |
| 4030740 | 4/1991 | Germany . |
| 59-14578 | 1/1984 | Japan ............... 296/204 |
| 3-28087 | 2/1991 | Japan ............... 296/63 |
| 3-85278 | 8/1991 | Japan . |
| 4-110250 | 4/1992 | Japan ............... 296/63 |
| 6-87469 | 3/1994 | Japan ............... 296/63 |
| 6-87468 | 3/1994 | Japan ............... 296/63 |
| 452196 | 8/1936 | United Kingdom . |
| 890590 | 3/1962 | United Kingdom . |

*Primary Examiner*—Karin L. Tyson
*Attorney, Agent, or Firm*—Keck, Mahin & Cate

[57] ABSTRACT

An undercarriage structure of a motor vehicle has a pair of front frames, a pair of floor frames integrally connected with rear ends of the front frames, a floor panel attached to the floor frames, and side sills extending in a front/rear direction and being connected with the sides of the floor frames. The floor frames, the side sills and the floor panel together form closed sections extending in the front/rear direction.

14 Claims, 15 Drawing Sheets

FRONT

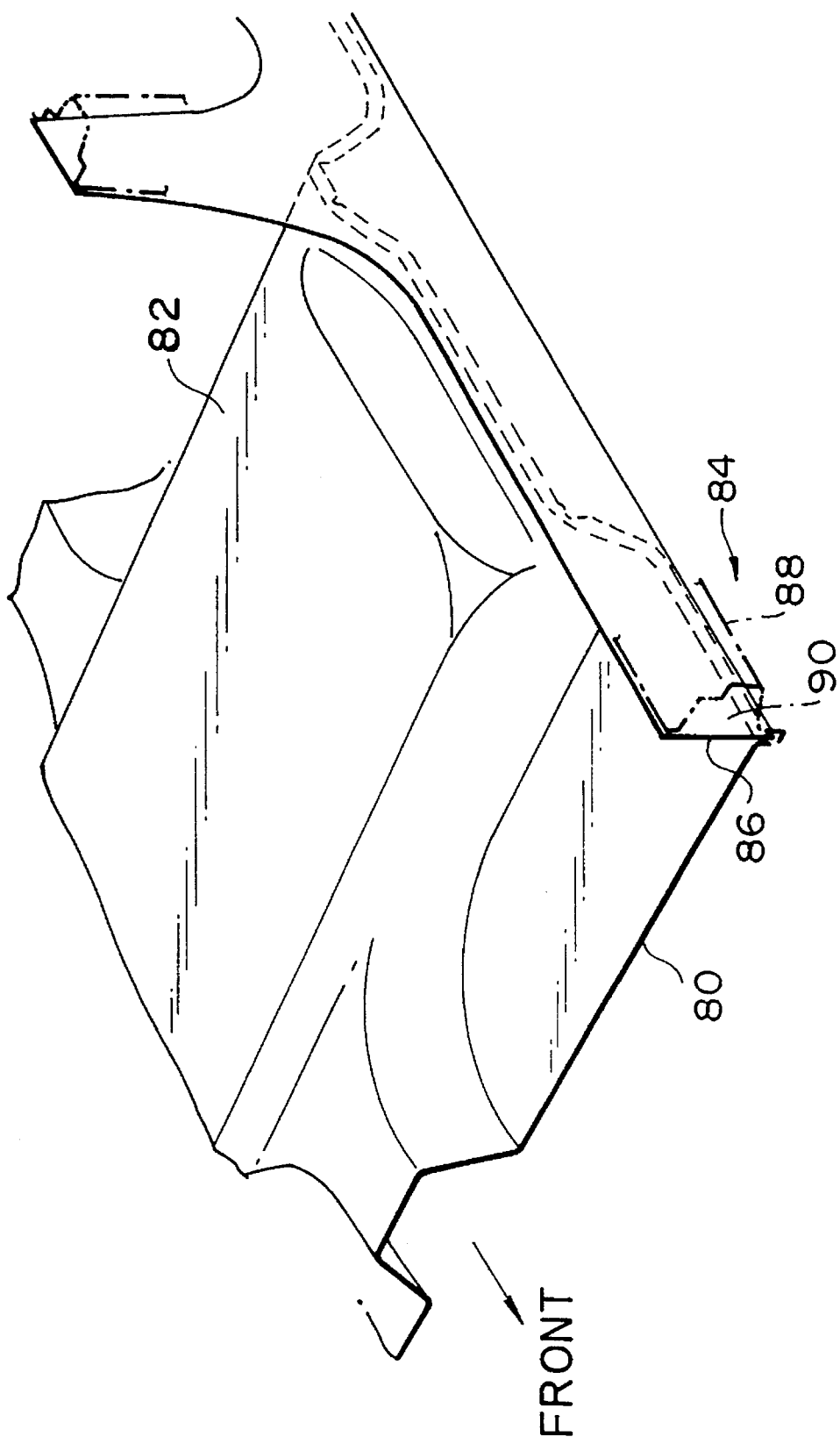

UNDERCARRIAGE STRUCTURE OF MOTOR VEHICLE

BACKGROUND OF THE INVENTION

1. Field of the Invention

The present invention relates to an undercarriage structure of a motor vehicle, and in particular, to an undercarriage structure of a motor vehicle having great rigidity against loads acting from the side.

2. Description of the Related Art

There is known a motor vehicle undercarriage structure as shown in Japanese Utility Model Laid-Open No. 3-85278. This conventional undercarriage structure is provided with a front floor, a tunnel portion integrated with the front floor extending in a front/rear direction, a rear floor disposed behind the front floor, and a pair of boxed channels formed by the rear edge of the front floor and the front edge of the rear floor, which are arranged to extend in the width direction and are connected at inner ends thereof to the tunnel portion.

In the conventional motor vehicle undercarriage, since the tunnel portion has great rigidity, the undercarriage is effective against loads acting from the side.

Nevertheless, there remains a need for a motor vehicle undercarriage with greatly increased rigidity and reduced weight.

SUMMARY OF THE INVENTION

It is therefore an object of the present invention to provide an undercarriage structure of a motor vehicle having great rigidity against loads acting from the side.

It is another object of the present invention to provide an undercarriage structure of a motor vehicle in which a variety of equipment can be disposed on and/or under a floor panel.

These and other objects are achieved according to the present invention by providing an undercarriage structure of a motor vehicle comprising a pair of front frames, a pair of floor frames integrally connected with rear ends of the front frames, a floor panel attached to the floor frames, and side sills extending in a front/rear direction and being connected with the sides of the floor frames. The said floor frames, the side sills and said floor panel together form closed sections extending in the front/rear direction.

In a preferred embodiment of the present invention, the floor panel forms a tunnel portion with a U-shaped cross section at an intermediate portion in the front/rear direction thereof. The tunnel portion extends in the width direction of the vehicle body, and said closed sections are provided to extend upwardly at the tunnel portion.

In another embodiment of the present invention, the structure further comprises a pre-silencer and a main silencer disposed in the tunnel portion.

In still another embodiment of the present invention, the structure further comprises seat slide rails for passenger seats on the tunnel portion of the floor panel.

According to another aspect of the present invention, an undercarriage structure of a motor vehicle comprises a pair of front frames, a pair of floor frames integrally connected with rear ends of the front frames, a floor panel attached to the floor frames, and side sills extending in a front/rear direction and being connected with the sides of the floor frames, said floor panel forming a tunnel portion with a U-shaped cross section at an intermediate portion in the front/rear direction thereof, said tunnel portion extending in a width direction of a vehicle body.

In a preferred embodiment of the present invention, said side sills provide closed sections extending in the front/rear direction, said closed section extending upwardly at the tunnel portion.

The above and other objects and features of the present invention will be apparent from the following description and by making reference to the accompanying drawings employed for showing preferred embodiments of the present invention.

BRIEF DESCRIPTION OF THE DRAWINGS

In the accompanying drawings:

FIG. 17 is a perspective view of an undercarriage of a motor vehicle in accordance with still another embodiment of the present invention.

DESCRIPTION OF THE PREFERRED EMBODIMENTS

The present invention will now be explained with reference to preferred embodiments and the drawings.

Figure 1:
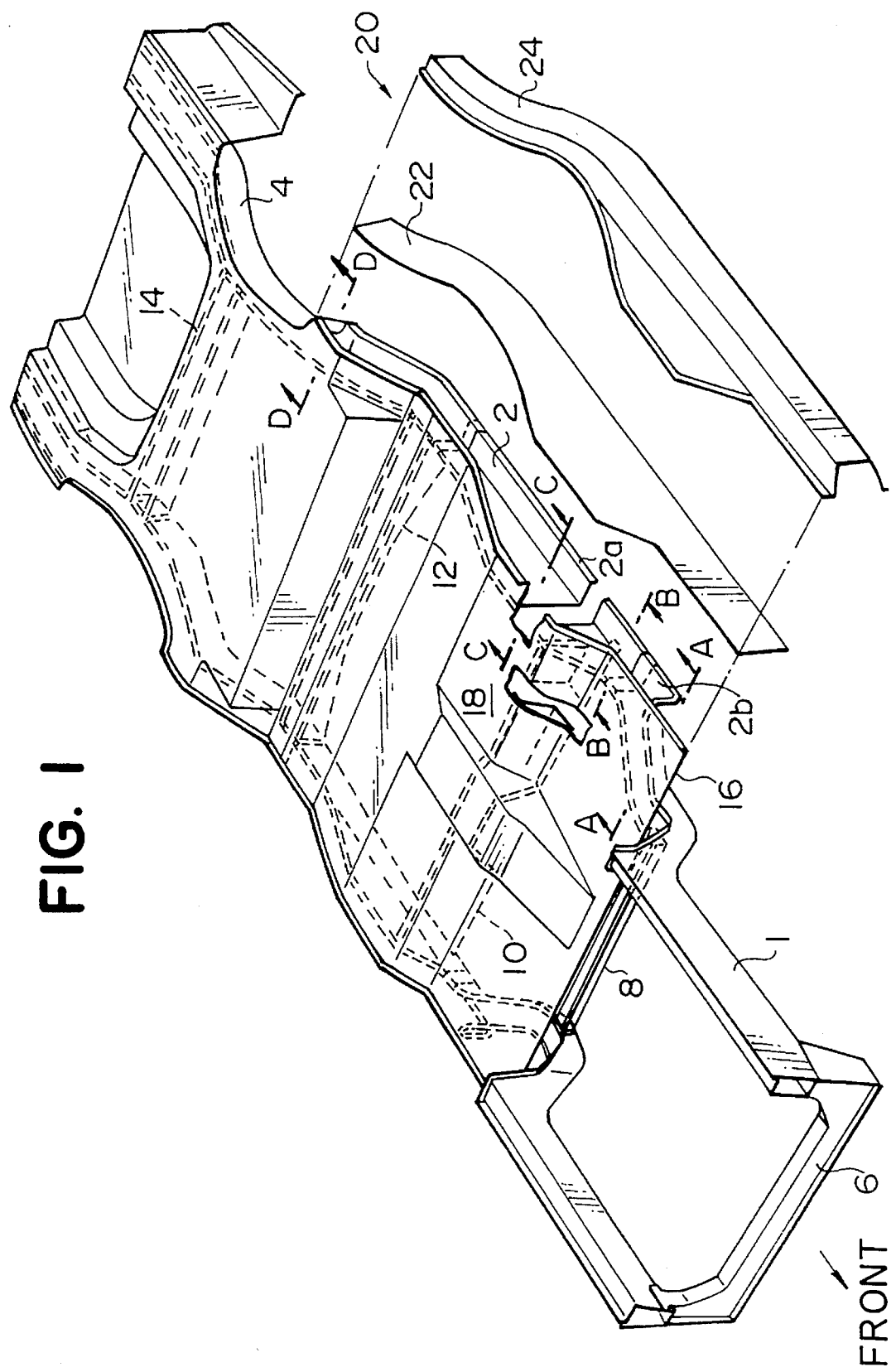
FIG. 1 is a perspective view showing an undercarriage of a motor vehicle in accordance with an embodiment of the present invention.

An embodiment of the present invention will be explained with reference to FIG. 1. Reference numeral 1 designates a pair of front frames which extend in the front/rear direction of the vehicle body under an engine compartment. A pair of floor frames 2 are connected or welded integrally with the rear ends of the front frames 1 to extend in the width direction at the front portion thereof and extend in the front/rear direction at the other portion thereof. A pair of rear frames 4 are connected or welded integrally with the rear ends of the floor frames 2 to extend under the trunk. The pairs of front frames 1, floor frames 2 and rear frames 4 are connected integrally by a plurality of cross members. Specifically, the front frames 1 are connected at front edges thereof by a first cross member 6 and are connected at the rear edges thereof by a dash lower cross member 8. The floor frames 2 are connected at a center portion thereof by a second cross member 10 and are connected at the rear edges thereof by a third cross member 12, and the rear frames 4 are connected at the center portion thereof by a fourth cross member 14.

The lower surface of a floor panel 16 on which seats (not shown) are attached is joined with the upper end surface of the floor frames 2. A tunnel portion 18 is provided in the floor panel 16 at an intermediate portion thereof in the front/rear direction. The tunnel portion 18 has a U-shaped cross section and extends in the width direction. Intermediate portions 2a of the floor frames 2 extend higher than other portions 26 thereof so that the tunnel portion 18 can be connected with the intermediate portion 2a.

Figure 3:
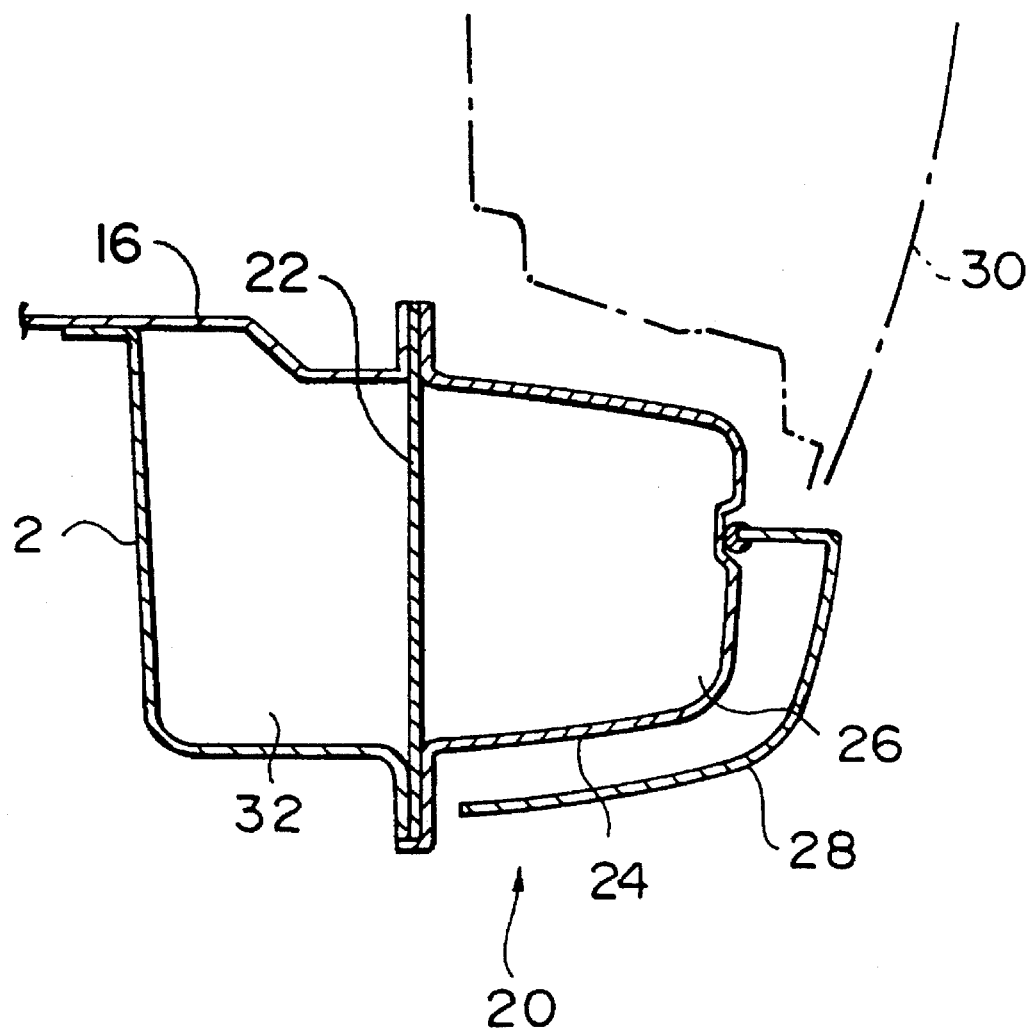
FIG. 3 is a sectional view taken along line B—B in FIG. 1.
Figure 4:
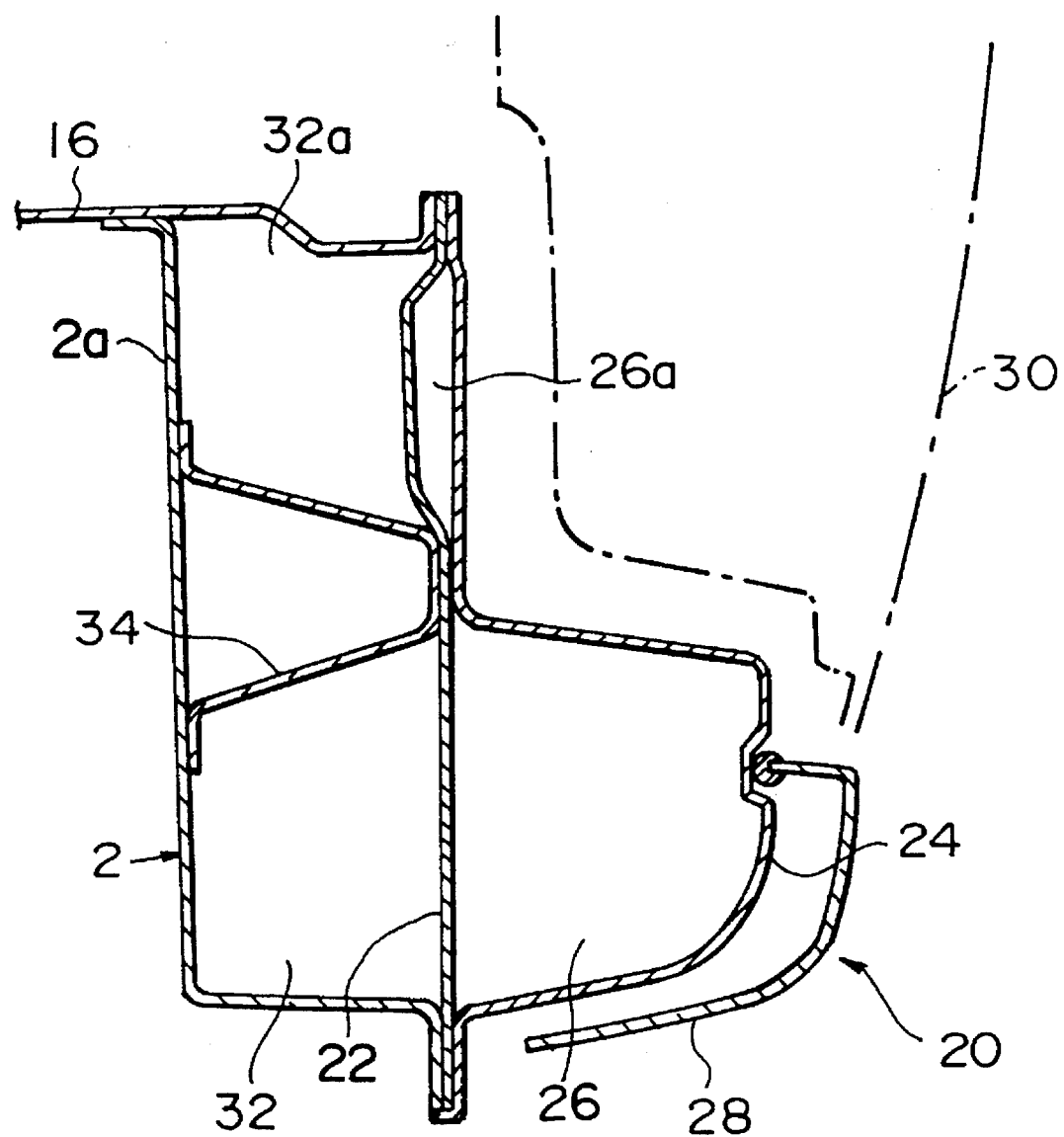
FIG. 4 is a sectional view taken along line C—C in FIG. 1.

Side sill 20 extending in the front/rear direction is attached to the side of each of the pair of the floor frames 2. The side sills 20 have side sill inners 22 and side sill outers 24 which form closed sections 26 as shown in FIG. 3. 3. Specifically, the front portions of the side sills 20 are attached to the front portions of the floor frames 2 and portions of the side sills 20 other than the front portions are provided so that the floor frames 2, the floor panel 16 and the side sill inners 22 form closed sections 32 as shown in FIGS. 3 and 4.

Figure 2:
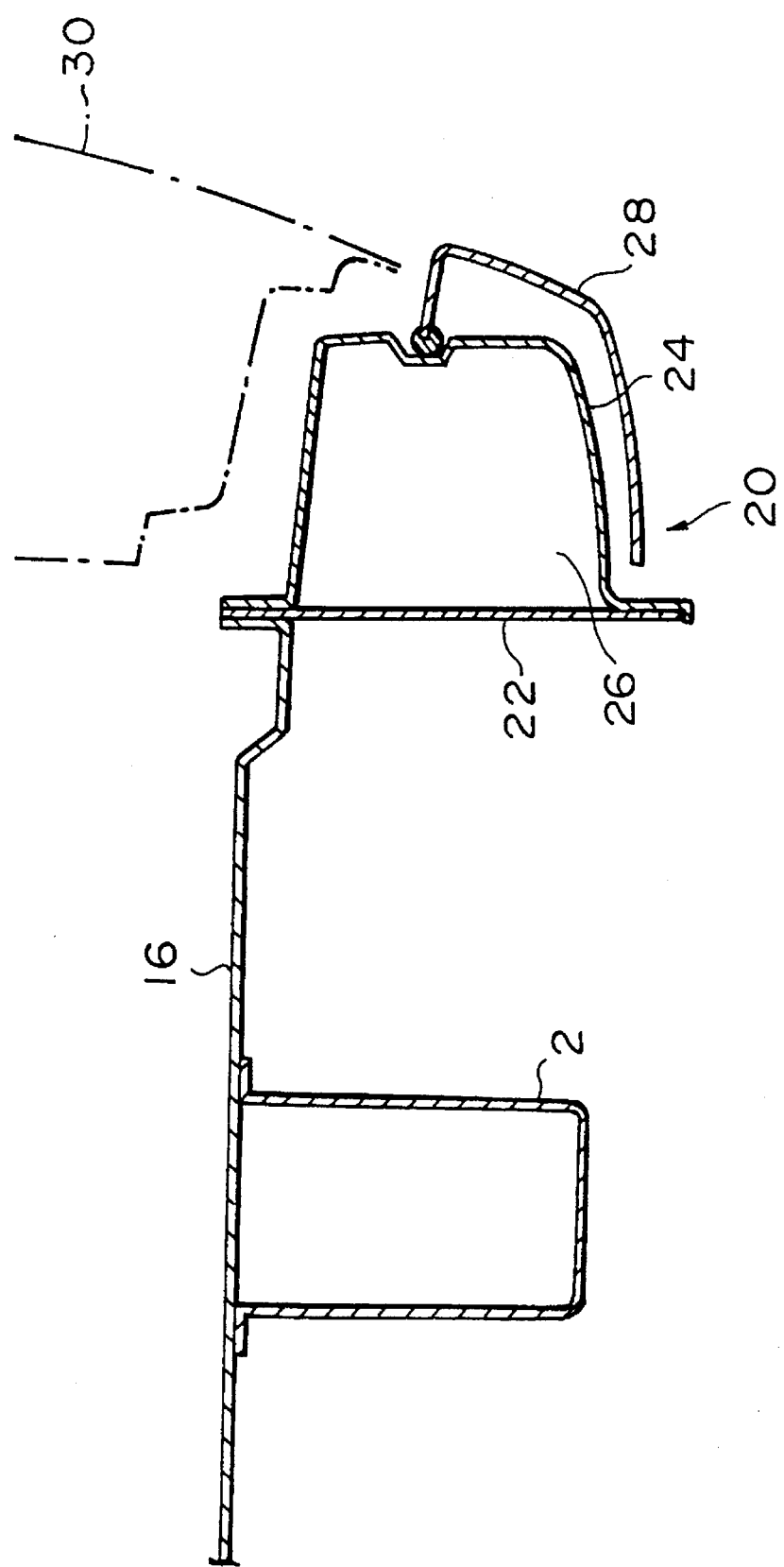
FIG. 2 is a sectional view taken along line A—A in FIG. 1.
Figure 5:
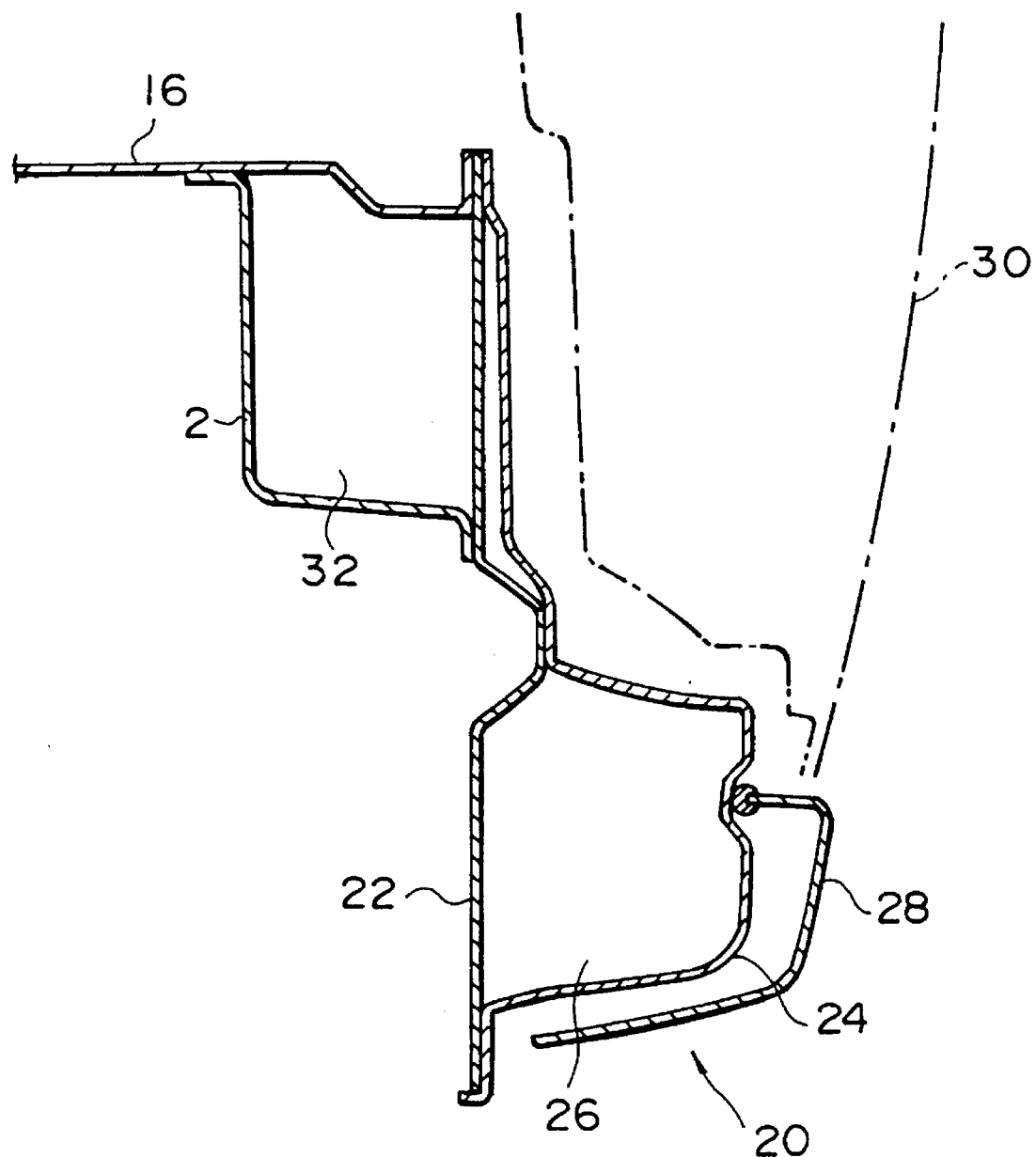
FIG. 5 is a sectional view taken along line D—D in FIG. 1.

The closed sections formed by the floor frames 2, the rear frames 4, the floor panel 16 and side sills 20 will be explained with reference to FIGS. 2–5. FIG. 2 is a sectional view taken along line A—A in FIG. 1, FIG. 3 is a sectional view taken along line B—B in FIG. 1, FIG. 4 is a sectional view taken along line C—C in FIG. 1, and FIG. 5 is a sectional view taken along line D—D in FIG. 1.

As shown in FIG. 2, at the portion taken along line A—A, the lower surface of the floor panel 16 is connected with the top end surfaces of the floor frames 2, and the side sill inners and outers 22 and 24 forming the closed sections 26 are both connected with the side end surfaces of the floor panel 16. Side sill garnishes or trim panels 28 are attached to the outer sides of the side sill outers 24. Vehicle doors 30 (only one shown) are installed above the side sills 20.

As shown in FIG. 3, at the portion taken along line B—B, the lower surface of the floor panel 16 is connected with the top end surfaces of the floor frames 2, and the side sill inners 22 and the side sill outers 24 are both connected with the side end surfaces of the floor panel 16. The floor frames 2, the floor panel 16 and the side sill inners 22 form the closed sections 32, and the side sill inners 22 and the side sill outers 24 form the closed sections 26 located outward of the closed sections 32.

As shown in FIG. 4, since the portion taken along line C—C is provided with the tunnel portion 18, the floor frames 2 are provided with the intermediate portions 2a whose heights are greater than the other portions of the frames 2. The lower surface of the floor panel 16 is connected with the top end surfaces of the intermediate portions 2a of the floor frames 2, and the side sill inners 22 and the side sill outers 24 are both connected with the side end surfaces of the floor panel 16. The floor frames 2, the floor panel 16 and the side sill inners 22 form the closed sections 32 so as to extend upwardly and, therefore, so as to have larger sectional areas than those at the other portions of the floor frames 2. Namely, the closed sections 32 have additional sectional areas 32a owing to the tunnel portion 18. Further, the side sill inners 22 and the side sill outers 24 form the closed sections 26 so as to have additional section areas 26a extending upwardly. The closed sections 32 are provided with reinforcements 34 extending in the width direction for greatly increasing rigidity.

As shown in FIG. 5, at the portion taken along line D—D, the lower surface of the floor panel 16 is connected with the top end surfaces of the floor frame 2, and the side sill inners 22 and the side sill outers 24 are both connected with the side end surfaces of the floor panel 16. The floor frames 2, the floor panel 16 and the side sill inners 22 again form the closed sections 32, and the side sill inners 22 and the side sill outers 24 form the closed sections 26 outward of the closed sections 32.

According to the embodiment of the present invention described above, the motor vehicle undercarriage structure is provided with the U-shaped tunnel portion 18 extending in the width direction at an intermediate portion of the floor panel 16 in the front/rear direction, and is further provided with the intermediate portions 2a of the floor frame 2 with which the tunnel portion 18 of the floor panel 16 is connected, and which therefore has larger height. As a result, the tunnel portion 18 of the floor panel 16 works the same as a cross member to increase the rigidity of the vehicle body in its width direction, namely to increase the rigidity of the vehicle against loads acting from the side.

Further, since the side sills 20 are provided so as to extend in the front/rear direction on the outer sides of the floor frames 2, and the floor frames 2, the floor panel 16 and the side sill inners 22 form the closed sections 32, the side sills 20 and the closed sections 32 also work like the tunnel portion 18 of the floor panel 16 to further increase the rigidity of the vehicle body in its width direction, namely to increase the rigidity of the vehicle against loads acting from the side.

Further, since the floor frames 2, the floor panel 16 and the side sill inners 22 form the closed sections 32 which have the additional closed sections 32a extending upwardly at the tunnel portion 18 of the floor panel 16, the closed section 32 with the additional closed sections 32a work to further increase the rigidity of the vehicle body in its width direction, namely to increase the rigidity of the vehicle against loads acting from the side.

Further, since the side sill inners 22 and the side sill outers 24 of the side sills 20 form the closed sections 26, and, further, the closed sections 26 have the additional closed sections 26a extending upwardly at the tunnel portion 18 of the floor panel 16, the closed sections 26 with the additional closed sections 26a work to further increase the rigidity of the vehicle body in its width direction, namely to increase the rigidity of the vehicle against loads acting from the side.

In the embodiment of the present invention, since the tunnel portion 18 is provided in the floor panel 16, the tunnel portion 18 can be effectively utilized by disposing various types of equipment on and/or under the floor panel 16, as explained below.

Figure 6:
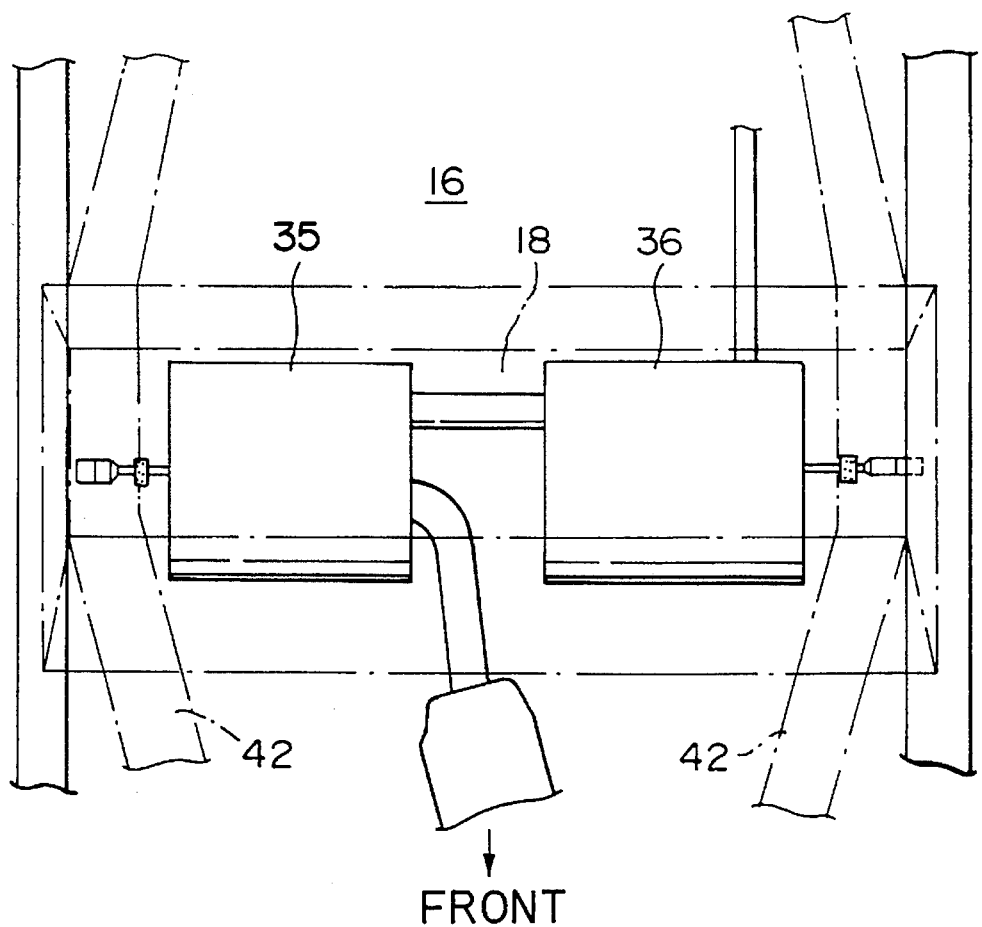
FIG. 6 is a plan view seen from above showing a floor panel and a tunnel portion in accordance with the embodiment of the present invention.
Figure 7:
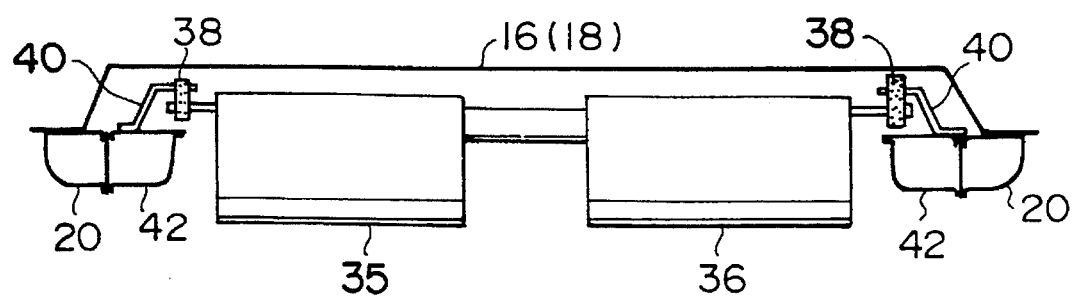
FIG. 7 is a front view of FIG. 6.

FIG. 6 is a plan view seen from above showing the floor panel and the tunnel portion in accordance with the embodiment of the present invention and FIG. 7 is a front view of FIG. 6.

In FIGS. 6 and 7, a pre-silencer 35 and a main silencer 36 are shown to be disposed in the width direction in the tunnel portion 18 of the floor panel 16. The pre-silencer 35 and the main silencer 36 are supported by floor frames 42 through brackets 40 and rubber mounts 38. The floor frames 42 are different from the floor frames 2 shown in FIG. 1 and are connected with the side sills 20 only in the tunnel portion 18. The pre-silencer 35 and main silencer 36 have conventionally been disposed in the front/rear direction in portions of an exhaust path other than the tunnel portion 18. However, according to the embodiment of the present invention, since the space in the tunnel portion 18 of the floor panel 16 can be effectively employed, the space conventionally allocated for the pre-silencer 35 and the main silencer 35 can be used to enlarge the size of the passenger compartment.

Figure 8:
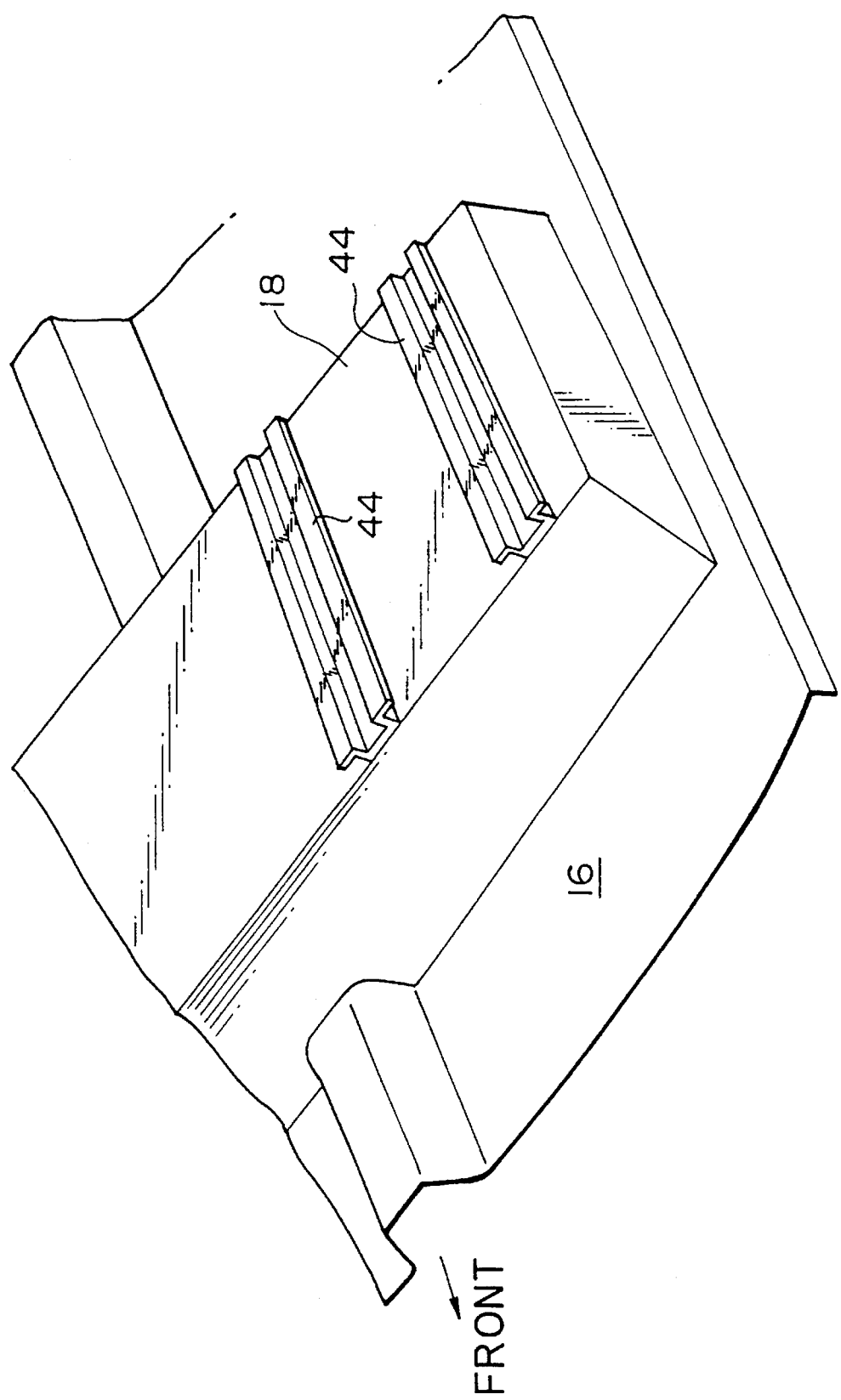
FIG. 8 is a perspective view showing a tunnel portion of a floor panel on which seat slide rails are attached in accordance with the embodiment of the present invention.

FIG. 8 is a perspective view showing the tunnel portion of the floor panel. As shown in FIG. 8, sets of slide rails 44 (only one set shown) are mounted on the tunnel portion 18 of the floor panel, and seats (not shown) are directly mounted on the slide rails 44. According to the embodiment of the present invention, the seat brackets which have conventionally been necessary for fastening the seats to the floor panel can be eliminated since the seats can be maintained at required height relative to the floor panel by utilizing the tunnel portion 18 of the floor panel 16.

Figure 9:
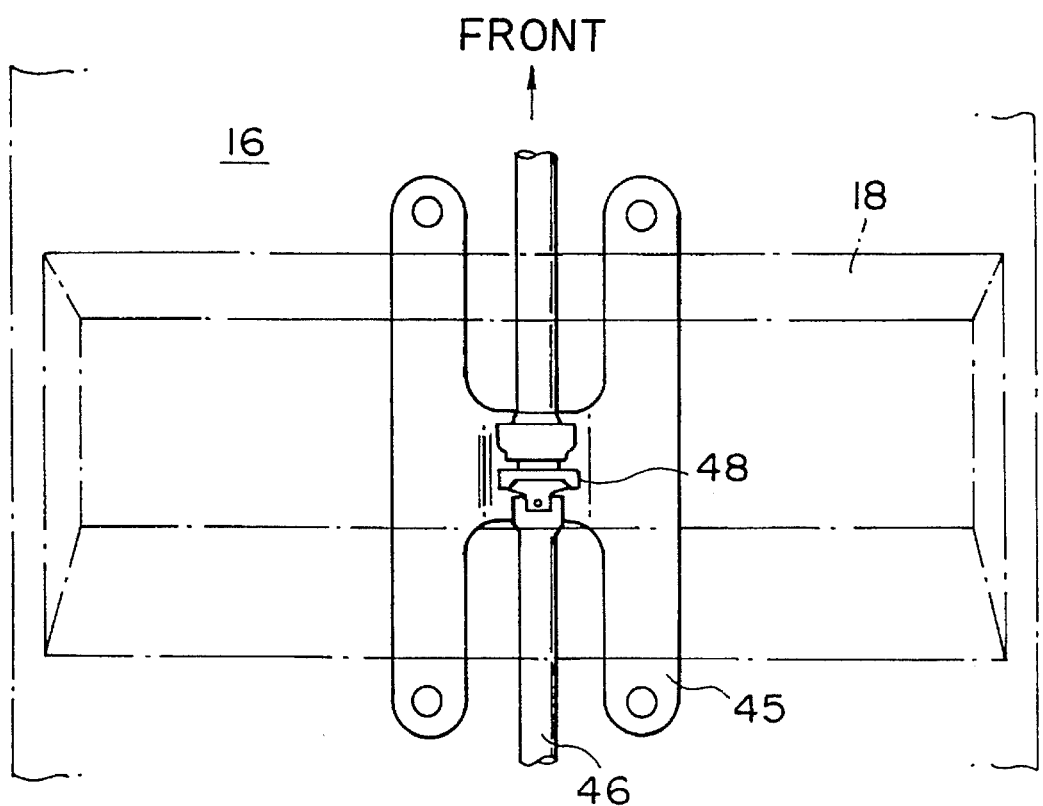
FIG. 9 is a plan view showing a tunnel portion of a floor panel under which a supporting bracket for supporting a joint for a four-wheel drive (4WD) shaft is attached in accordance with the embodiment of the present invention.
Figure 10:
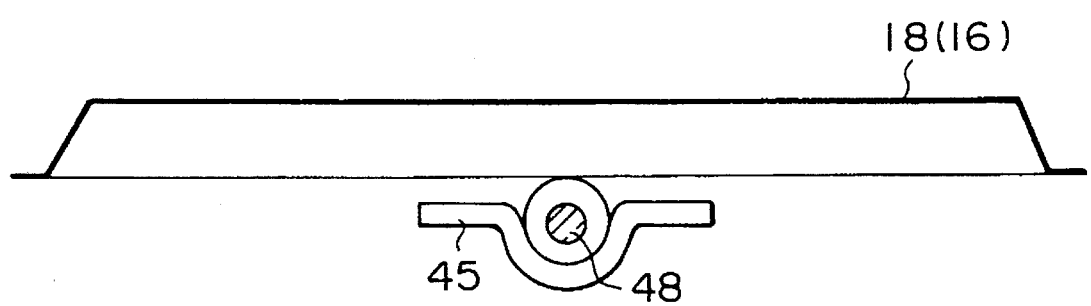
FIG. 10 is a side view of FIG. 9.
Figure 11:
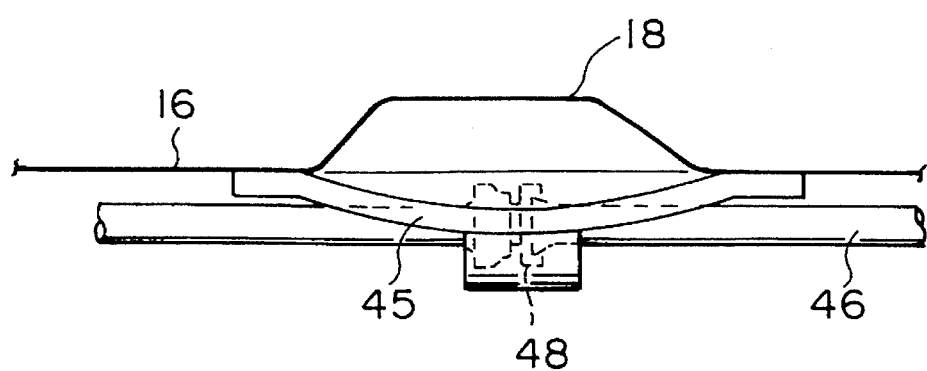
FIG. 11 is a front view of FIG. 9.

FIG. 9 is a plan view showing a tunnel portion of a floor panel beneath which a supporting bracket for supporting a joint for a 4WD shaft is attached, FIG. 10 is a side view of FIG. 9, and FIG. 11 is a front view of FIG. 9, in accordance with the embodiment of the present invention.

As shown in FIGS. 9–11, a supporting bracket 45 is attached to the floor panel 16 under the tunnel portion 18. The supporting bracket 45 is provided to connect the tunnel portion 18 in the front/rear direction and to support a joint 48 of a four-wheel drive (4WD) shaft 46. As a result, the joint 48 of the 4WD shaft 46 can be supported by the supporting bracket 45 provided in the tunnel portion 18, and the bending rigidity of the floor panel 16 in the front/rear direction can be increased.

Figure 12:
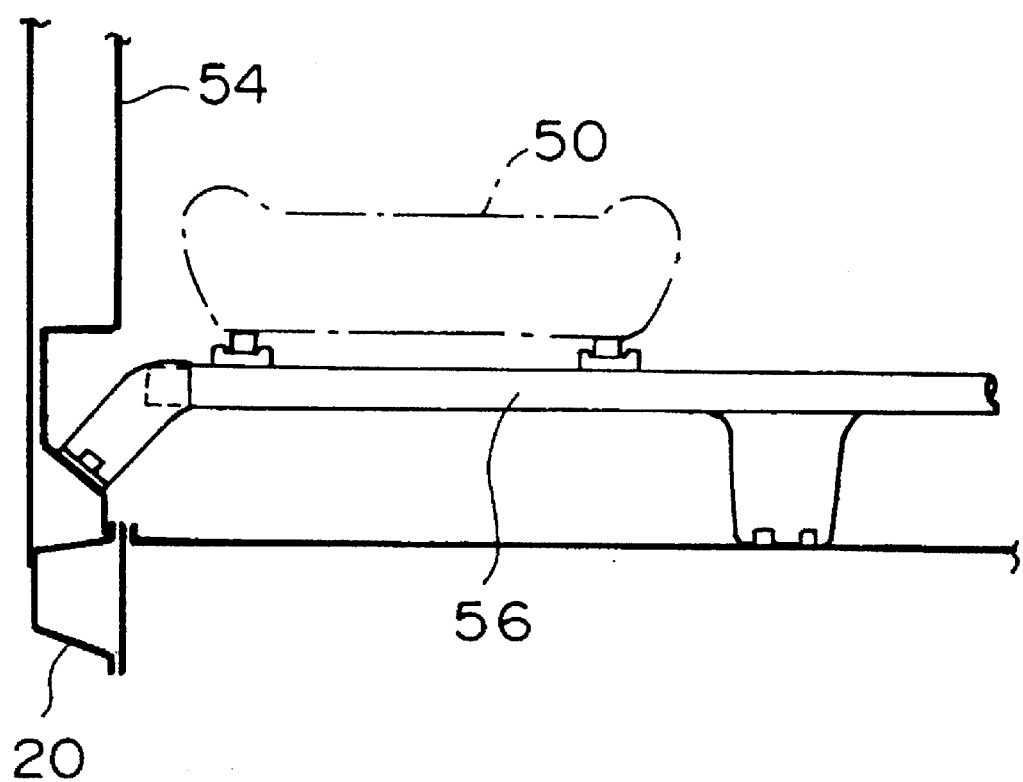
FIG. 12 is a front view showing a tunnel portion of a floor panel on which a seat is attached.
Figure 13:
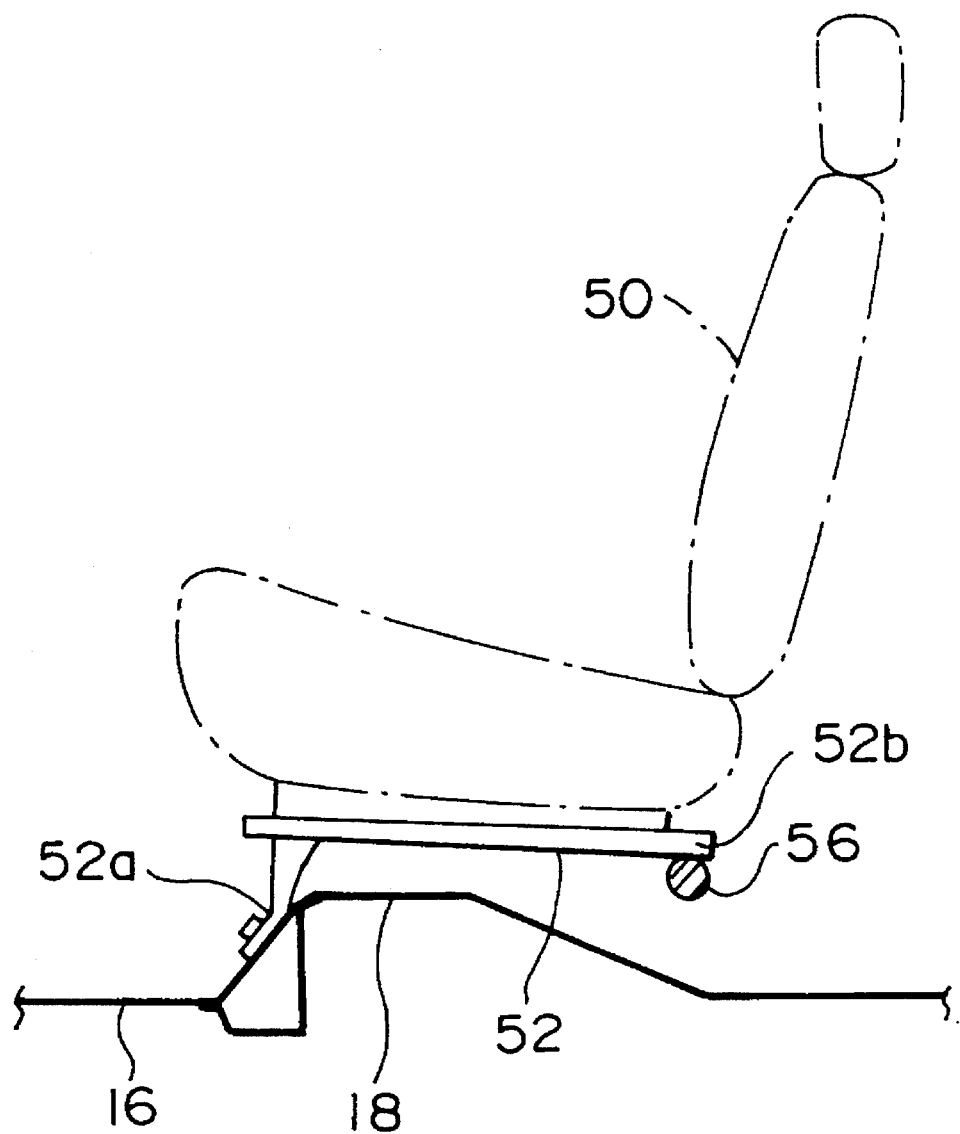
FIG. 13 is a side view of FIG. 12.

FIG. 12 is a front view showing a tunnel portion of a floor panel on which a seat is mounted, and FIG. 13 is a side view of FIG. 12, in accordance with the embodiment of the present invention.

As shown in FIGS. 12 and 13, a seat frame 52 extending in the front/rear direction is mounted with the undercarriage of a seat 50 (the other seats 50 are not shown). On the other hand, center pillars 54 are provided to extend upwardly on the side sills 20 at both sides of the vehicle body. A frame member 56 is disposed to extend in the width direction between the two center pillars 54. The front portion 52a of the seat frame 52 is attached to the upwardly extending portion of the tunnel portion 18 of the floor panel 16 and the rear portion 52b of the seat frame 52 is attached to the frame member 56 connected between the center pillars 54. As a result, since the front portion 52a and the rear portion 52b of the seat frame 52 are respectively attached to the upwardly extending portion of the tunnel portion 18 and the frame member 56 both of which have great rigidity, the seats 50 can be rigidly attached.

In the embodiment of the present invention explained above with reference to FIGS. 1–5, the floor frames 2 are connected with the side sills 20 and the tunnel portion 18 is provided under the floor panel 16. However, other embodiments of the present invention are possible in which the tunnel portion 18 is provided under the floor panel 16 without the floor frames 2 being connected with the side sills 20, as explained below.

Figure 14:
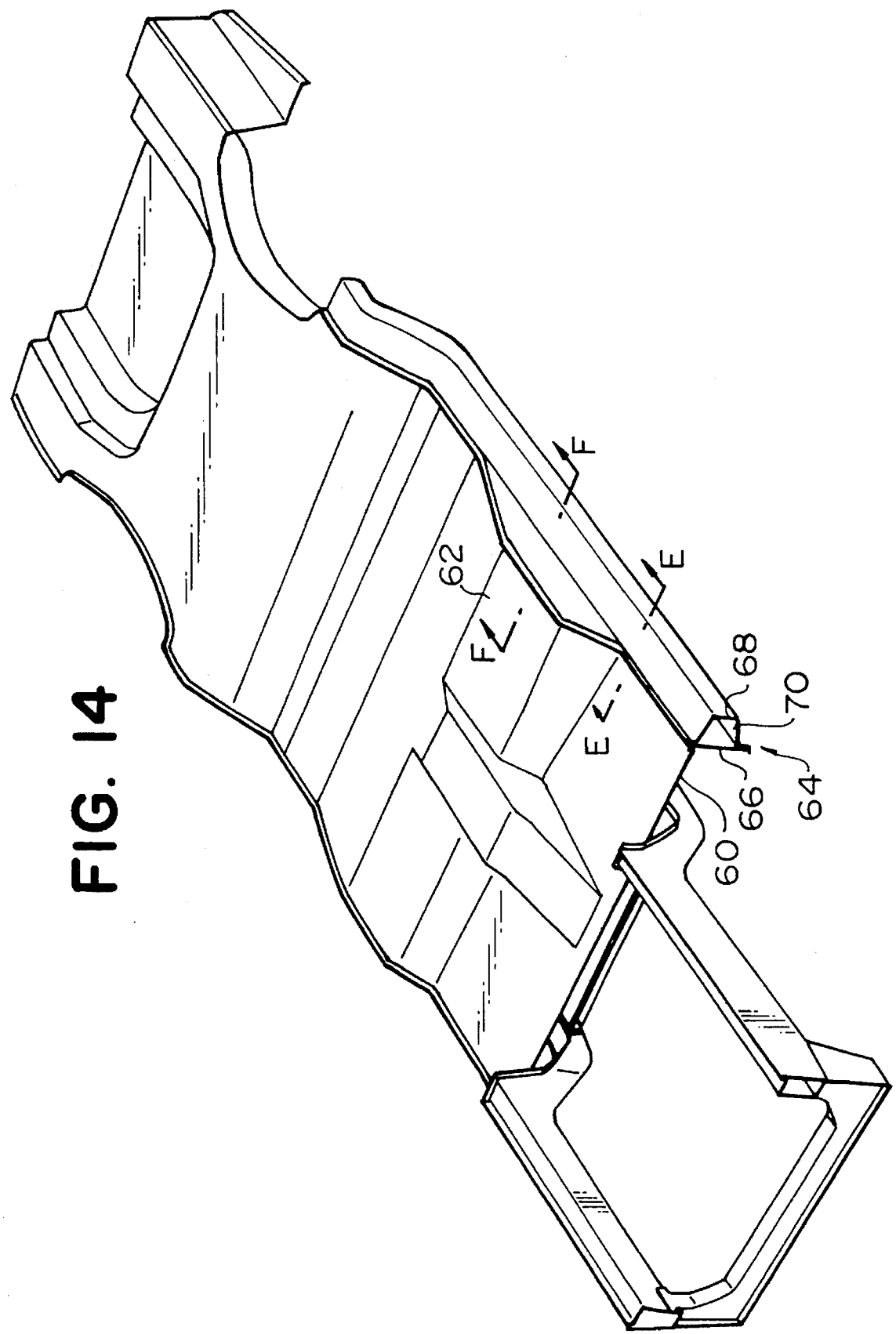
FIG. 14 a perspective view showing an undercarriage of a motor vehicle in accordance with another embodiment of the present invention.
Figure 15:
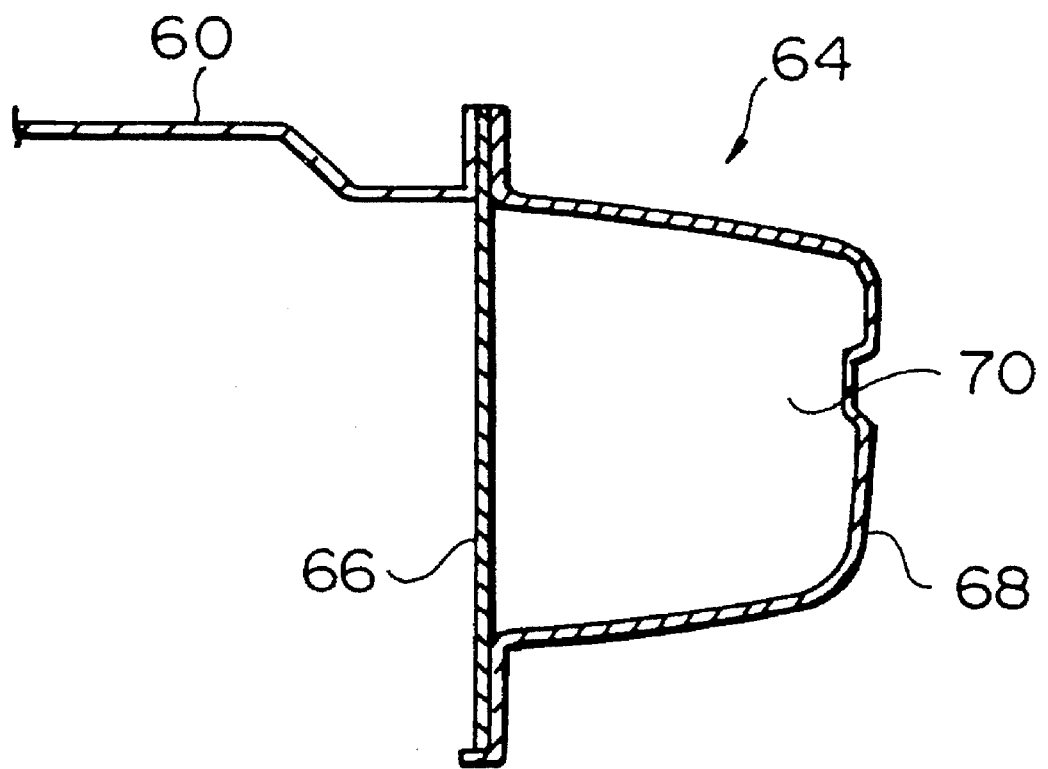
FIG. 15 is a sectional view taken along line E—E in FIG. 14.
Figure 16:
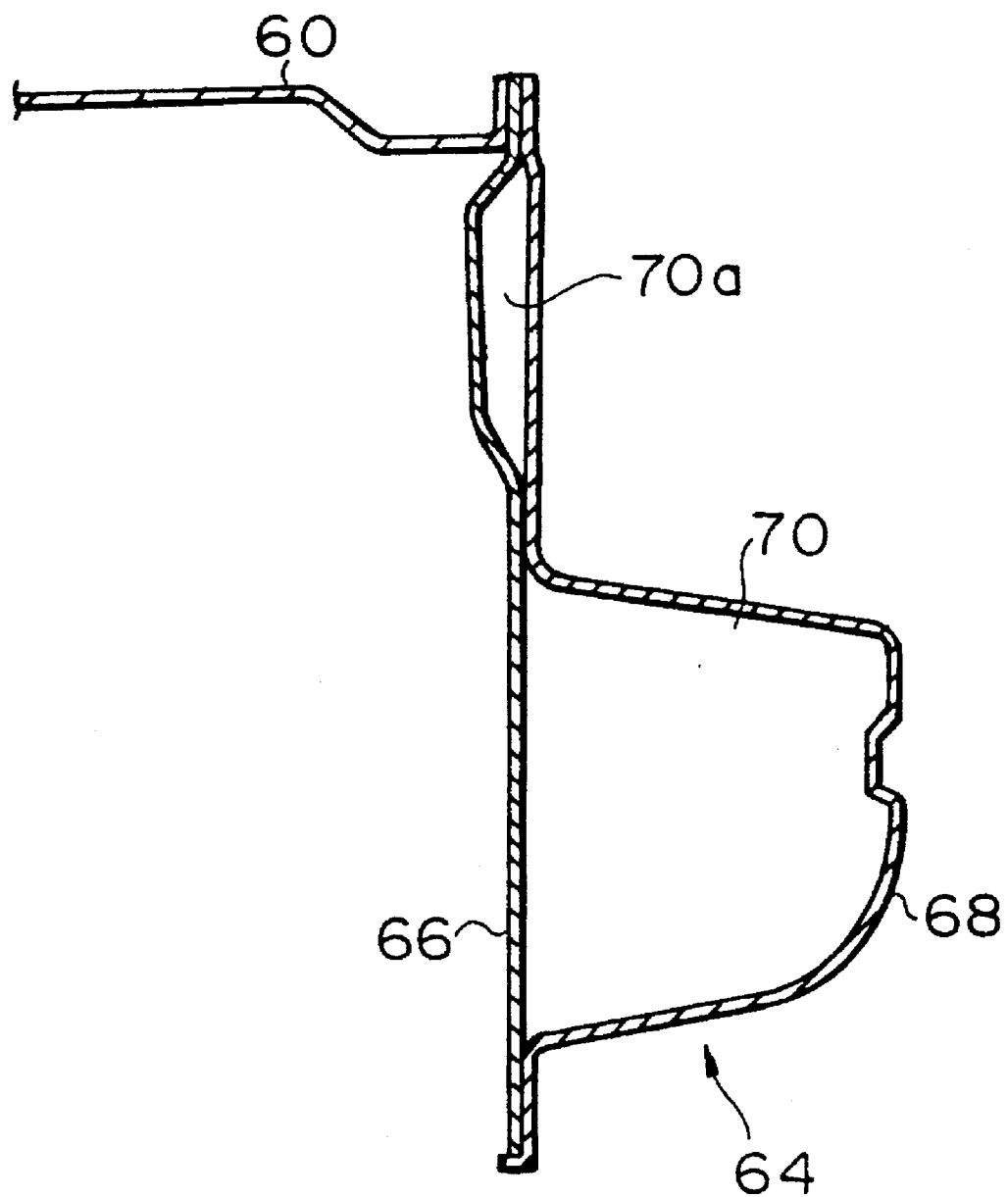
FIG. 16 is a sectional view taken along line F—F in FIG. 14.

FIG. 14 a perspective view showing a motor vehicle undercarriage in accordance with another embodiment of the present invention, FIG. 15 is a sectional view taken along line. E—E in FIG. 14, and FIG. 16 is a sectional view taken along line F—F in FIG. 14, in accordance with another embodiment of the present invention.

As shown in FIG. 14, a tunnel portion 62 with a U-shaped cross section is provided in an intermediate portion in the front/rear direction of a floor panel 60 to extend in the width direction of the vehicle body. Side sills 64 (only one shown) extending in the front/rear direction are attached to the outer sides of the floor panel 60. The side sills 64 have side sill inners 66 and side sill outers 68 which form closed sections 70. At the portion taken along line E—E, the side sill inners 66 and side sill outers 66 of the side sills 64 form the closed sections 70 as shown in FIG. 15. As shown in FIG. 16, at the portion taken along line F—F, the side sill inners 66 and the side sill outers 68 form closed sections 70 which have additional closed sections 70a extending upwardly at the tunnel portion 62 of the floor panel 60.

According to this embodiment of the present invention, the tunnel portion 62 with the U-shaped cross section is provided in the intermediate portion in the front/rear direction of the floor panel 60 so as to extend in the width direction of the vehicle body, and the side sills 64 extending in the front/rear direction are attached to the outer sides of the floor panel 60. As a result, the tunnel portion 62 increases rigidity of the vehicle body against loads acting from the side. Further, since the side sill inners 66 and side sill outers 68 of the side sills 64 form the closed sections 70 and the closed sections 70 have the additional closed sections 70a extending upwardly at the tunnel portion 62 of the floor panel 60, the rigidity of the vehicle body is further increased against loads acting from the side.

In the embodiment of the present invention, a pre-silencer, a main silencer, seat slide rails, a supporting joint for a 4WD shaft, seat attachments and the like may again be disposed under the tunnel portion 62.

In the embodiment of the present invention explained above with reference to FIGS. 14–16, the closed sections 70 of the side sills have the additional closed sections 70a extending upwardly at the tunnel portion 62 of the floor panel 60. Differently from this, another embodiment of the present invention is possible in which the closed sections of side sills are constant along the front/rear direction, as explained below.

FIG. 17 is a perspective view of a motor vehicle undercarriage in accordance with still another embodiment of the present invention. As shown in FIG. 17, a tunnel portion 82 with a U-shaped cross section is provided in an intermediate portion in the front/rear direction of a floor panel 80 to extend in the width direction of the vehicle body. Side sills 84 (only one shown) extending in the front/rear direction are attached to the outer sides of the floor panel 80. The side sills 84 have side sill inners 86 and side sill outers 88 which form closed sections 90. The closed sections 90 of the side sills 84 are constant along the front/rear direction and do not change at the tunnel portion 82 of the floor panel 80.

According to this embodiment of the present invention, the tunnel portion 82 with the U-shaped cross section is provided in the intermediate portion in the front/rear direction of the floor panel 82 so as to extend in the width direction of the vehicle body, and the side sills 84 extending in the front/rear direction are attached to the outer sides of the floor panel 80. As a result, the tunnel portion 82 increases the rigidity of the vehicle body against loads acting from the side.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. An undercarriage structure of a motor vehicle comprising:
    a frame comprising:
        a pair of right and left front frame portions members extending in a front and rear direction and including a pair of front frames and a pair of floor frames integrally connected with rear ends of the front frame portions;
        a floor panel attached to upper surfaces of the frame; and
        a pair of right and left side sills extending in said front and rear direction at opposite lateral sides of said floor panel;
    wherein said frame (1) extends downwardly to a lower surface of the floor panel at a front end side of the floor panel to form first closed sections together with the floor panel, (2) curves outwardly in a vehicle width direction at the front end side of the floor panel so as to be connected with said side sills, (3) extends toward a rear side of the vehicle parallel to the side sills while connected to the side sills, and (4) forms second closed sections together with both the floor panel and the side sills.

2. An undercarriage structure of a motor vehicle according to claim 1, wherein said floor panel forms a tunnel portion with an upwardly convex cross section at an intermediate portion in the front and rear direction thereof, said tunnel portion extends in said vehicle width direction, and said closed sections are enlarged and are provided to extend upwardly at the tunnel portion.

3. An undercarriage structure of a motor vehicle according to claim 2, and further comprises a pre-silencer and a main silencer disposed in the tunnel portion.

4. An undercarriage structure of a motor vehicle according to claim 2, and further comprising seat slide rails for passenger seats on the tunnel portion of the floor panel.

5. An undercarriage structure of a motor vehicle according to claim 2, and further comprising a connecting member connected at opposite ends of the tunnel portion in the front and rear direction for supporting a joint of a four-wheel drive shaft.

6. An undercarriage structure of a motor vehicle according to claim 2, and further comprising seat frames for passenger seats, pillars extending upwardly from said side sills and a frame member extending between said pillars, front portions of the seat frames being connected with an upwardly extending portion of the tunnel portion and rear portions of the seat frames being connected with the frame member extending between said pillars.

7. An undercarriage structure of a motor vehicle according to claim 2, wherein said side sills include side sill inners and side sill outers which form third closed sections extending in the vehicle front and rear direction, said third closed sections extending upwardly so as to be enlarged at the tunnel portion.

8. An undercarriage structure of a motor vehicle according to claim 2, wherein said frame includes reinforcements extending in the vehicle width direction within the second closed sections.

9. An undercarriage structure of a motor vehicle according to claim 2, wherein said side sills include side sill inners and side sill outers which form third closed sections extending in the vehicle front and rear direction, said third closed sections extending upwardly so as to be enlarged at rear portions of the frame.

10. An undercarriage structure of a motor vehicle comprising:
    a pair of right and left frame members extending in a front and rear direction and including a pair of front frames and a pair of floor frames integrally connected with rear ends of the front frames;
    a floor panel attached to upper surfaces of the frame members; and
    a pair of right and left side sills extending in said front and rear direction at opposite lateral sides of said floor panel, each said side sill comprising inner and outer panels;
    wherein said floor panel includes a tunnel portion extending in a vehicle width direction with an upwardly convex cross section at an intermediate portion in the front and rear direction thereof and said side sill inner and outer panels form closed sections extending in said front and rear direction, said panels extending upwardly so as to be enlarged along end portions of the tunnel portion at sides of the tunnel portion.

11. An undercarriage structure of a motor vehicle according to claim 10, and further comprising a pre-silencer and a main silencer disposed in the tunnel portion.

12. An undercarriage structure of a motor vehicle according to claim 10, and further comprising seat slide rails for passenger seats on the tunnel portion of the floor panel.

13. An undercarriage structure of a motor vehicle according to claim 10, and further comprising a connecting member connected at opposite ends of the tunnel portion in the front and rear direction for supporting a joint of a four-wheel drive shaft.

14. An undercarriage structure of a motor vehicle according to claim 10, and further comprising seat frames for passenger seats, pillars extending upwardly from said side sill and a frame member extending between said pillars, front portions of the seat frames being connected with an upwardly extending portion of the tunnel portion and rear portions of the seat frames being connected with the frame member extending between said pillars.

* * * * *